United States Patent
Hsiao et al.

(10) Patent No.: US 9,178,457 B2
(45) Date of Patent: Nov. 3, 2015

(54) GENERATOR BRAKE SYSTEM AND METHOD OF CONTROLLING THE SAME

(71) Applicant: DELTA ELECTRONICS, INC., Taoyuan County (TW)

(72) Inventors: Chih-Hung Hsiao, Taoyuan County (TW); Jo-Fang Wei, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 0 days.

(21) Appl. No.: 14/282,078

(22) Filed: May 20, 2014

(65) Prior Publication Data

US 2015/0180394 A1   Jun. 25, 2015

(30) Foreign Application Priority Data

Dec. 25, 2013 (CN) .......................... 2013 1 0746943

(51) Int. Cl.
- *H02P 9/00* (2006.01)
- *H02P 3/00* (2006.01)
- *H02P 9/06* (2006.01)
- *H02P 9/02* (2006.01)
- *H02P 3/22* (2006.01)
- *F03D 9/00* (2006.01)
- *H02P 9/04* (2006.01)

(52) U.S. Cl.
CPC ... *H02P 9/02* (2013.01); *H02P 3/22* (2013.01)

(58) Field of Classification Search
USPC .......................... 322/10, 94; 290/44; 318/759
See application file for complete search history.

(56) References Cited

U.S. PATENT DOCUMENTS

| | | | |
|---|---|---|---|
| 3,045,166 A * | 7/1962 | Robinson | 318/367 |
| 3,593,078 A * | 7/1971 | Domshy et al. | 318/150 |
| 3,815,002 A * | 6/1974 | Clemente et al. | 318/759 |
| 3,991,352 A * | 11/1976 | Fry et al. | 318/759 |
| 5,050,059 A * | 9/1991 | Neeser et al. | 363/65 |
| 5,363,032 A * | 11/1994 | Hanson et al. | 322/10 |
| 5,406,186 A * | 4/1995 | Fair | 318/798 |
| 5,581,168 A * | 12/1996 | Rozman et al. | 318/723 |
| 5,594,322 A * | 1/1997 | Rozman et al. | 322/10 |
| 6,998,726 B2 * | 2/2006 | Sarlioglu et al. | 290/31 |
| 7,456,510 B2 * | 11/2008 | Ito et al. | 290/44 |
| 7,508,089 B2 * | 3/2009 | Guang et al. | 290/44 |
| 8,013,459 B2 * | 9/2011 | Ito et al. | 290/44 |
| 8,299,650 B2 * | 10/2012 | Yasugi | 307/103 |
| 8,487,582 B2 * | 7/2013 | King et al. | 320/104 |
| 8,901,762 B2 * | 12/2014 | Hsiao et al. | 290/44 |
| 2006/0249957 A1 * | 11/2006 | Ito et al. | 290/44 |
| 2007/0216163 A1 * | 9/2007 | Guang et al. | 290/44 |

(Continued)

FOREIGN PATENT DOCUMENTS

JP   2002339856 A   * 11/2002   .............. F03D 7/04

*Primary Examiner* — Pedro J Cuevas
(74) *Attorney, Agent, or Firm* — Hauptman Ham, LLP (57) ABSTRACT

The present invention provides a generator brake system for providing a brake control of a generator. The generator brake system includes a power conversion unit, a sensing unit, and a control unit. The power conversion unit receives an output voltage and an output current, generated from the generator, and the power conversion unit has at least one switch unit. The sensing unit receives the output voltage and the output current to generate a voltage signal and a current signal. The control unit receives the voltage signal and the current signal. When receiving a braking signal, the control unit generates at least one control signal for correspondingly turning on the at least one switch unit, thus braking the generator in a short circuit manner.

13 Claims, 9 Drawing Sheets

(56) References Cited

U.S. PATENT DOCUMENTS

| 2009/0079195 | A1* | 3/2009 | Ito et al. | 290/44 |
|---|---|---|---|---|
| 2011/0204854 | A1* | 8/2011 | King et al. | 320/163 |
| 2013/0161950 | A1* | 6/2013 | Hsiao et al. | 290/44 |
| 2013/0194704 | A1 | 8/2013 | Lewis | |
| 2013/0334818 | A1* | 12/2013 | Mashal et al. | 290/44 |
| 2014/0015506 | A1* | 1/2014 | Hsiao et al. | 323/299 |
| 2014/0175796 | A1* | 6/2014 | Rasmussen | 290/44 |
| 2014/0312621 | A1* | 10/2014 | Hung et al. | 290/44 |

* cited by examiner

GENERATOR BRAKE SYSTEM AND METHOD OF CONTROLLING THE SAME

BACKGROUND

1. Technical Field

The present invention generally relates to a generator brake system and a method of controlling the same, and more particularly to a generator brake system for a permanent magnet generator (PMG) and a method of braking the PMG in a short circuit manner by turning on at least one switch unit.

2. Description of Prior Art

In the current wind power generation system, the wind turbine is provided to convert the wind power into the electric power with a constant frequency by inverters. Hence, the reliability of the wind power generation system as well as that of the inverter system is critical. In addition, the protection ability of the wind power system will be subject to strict tasks because the wind frequently and intensely changes. Also, the inverter system would be damaged when the wind turbine is operated at a high wind speed.

Figure 1:
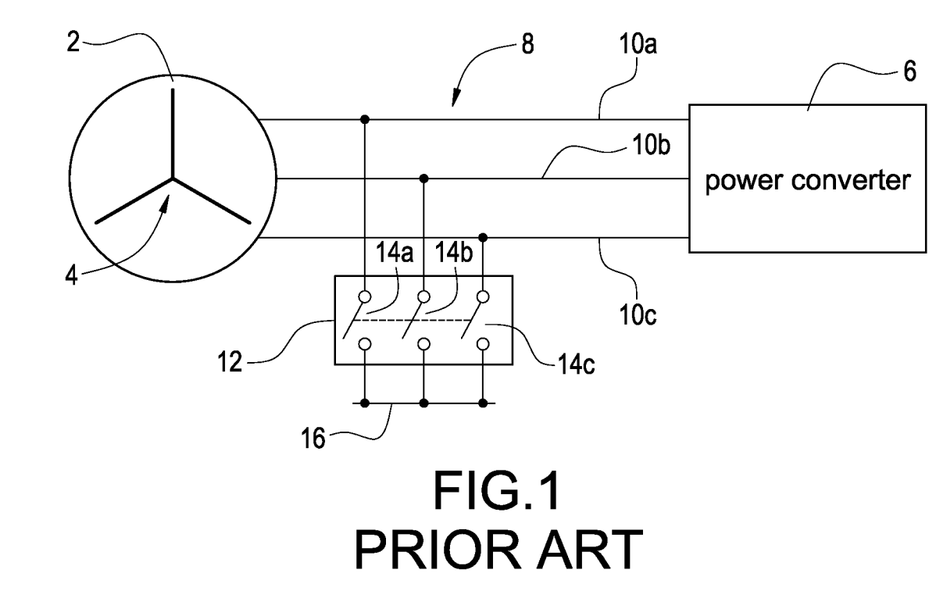
FIG. 1 illustrates a conventional protection circuit for electrical machines.

Please refer to FIG. 1 which shows a conventional protection circuit for electrical machines. US 2013/0194704 disclosed the protection circuit and method for electrical machines. The generator is a permanent magnet generator 2 with a three-phase stator winding 4. Stator terminals of the permanent magnet generator 2 are connected to the power converter 6 through the three-phase circuit 8. The three-phase circuit 8 has three separate conductors 10a, 10b, 10c, each of which is connected to a respective phase of the stator winding 4. A contact device 12 includes three separate contacts 14a, 14b, 14c, each of which is connected between one of the conductors 10a, 10b, 10c and a common conductor 16.

When the generator 2 normally operates, the contacts 14a, 14b, 14c are open and electrical power flows from the stator terminals of the generator 2 to the power converter 6 through the three-phase circuit 8. If there is a short circuit or fault in the three-phase circuit 8 or the power converter 6, the generator 2 will start to produce a fault current. At this time, the contacts 14a, 14b, 14c can be closed to connect the conductors 10a, 10b, 10c to the common conductor 16. Once the contacts 14a, 14b, 14c are closed then no fault current will flow from the generator 2 to the power converter 6. Therefore, the addition of the contactor device 12 minimizes any damaged risk of the power converter 6. The contacts 14a, 14b, 14c of the contactor device 12 can be opened again once the fault current has been cleared.

However, once the switch contacts are used to provide brake protection for the generator, the problems of reduction of life time and invalidation of brake protection of the hardware switches would occur because of frequently switching the switches and failure of switch contacts.

SUMMARY

The present invention provides a generator brake system and a method of controlling the generator by the firmware or software to achieve the brake control of the generator and overcome the problems of reduction of life time and invalidation of brake protection of the hardware switches. In addition, a control unit generates the high-level control signal to turn on the switch unit to brake the generator in a short circuit manner when an output voltage is less than a threshold voltage so that the generator can be braked under the low-current operation to ensure safety and accuracy of braking the generator.

An object of the present invention is to provide a generator brake system providing a brake control for a generator driven by an external torque to solve the above-mentioned problems. Accordingly, the generator brake system includes a power conversion unit, a sensing unit, and a control unit. The power conversion unit receives an output voltage and an output current, generated from the generator, and the power conversion unit has at least one switch unit. The sensing unit receives the output voltage and the output current, and generates a voltage signal and a current signal. The control unit receives the voltage signal and the current signal. The control controls the output voltage to be gradually reduced when the control unit receives a brake signal. The control unit generates at least one control signal to correspondingly turn on at least one switch unit to brake the generator in a short circuit manner when the output voltage is less than a threshold voltage.

Another object of the present invention is to provide a method of braking a generator driven by an external torque to solve the above-mentioned problems. Accordingly, the method comprises the steps of providing a power conversion unit with at least one switch unit to receive an output voltage and an output current, generated from the generator; providing a sensing unit to receive the output voltage and the output current and generate a voltage signal and a current signal; providing a control unit to receive the voltage signal and the current signal; wherein the output voltage is gradually reduced by the control unit when the control unit receives a brake signal; and at least one control signal is generated by the control unit to correspondingly turn on the at least one switch unit so as to brake the generator in a short circuit manner when the output voltage is less than a threshold voltage.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWINGS

The features of the present invention believed to be novel are set forth with particularity in the appended claims. The present invention itself, however, may be best understood by reference to the following detailed description of the present invention, which describes an exemplary embodiment of the present invention, taken in conjunction with the accompanying drawings, in which:

DETAILED DESCRIPTION

Reference will now be made to the drawing figures to describe the present invention in detail.

Figure 2:
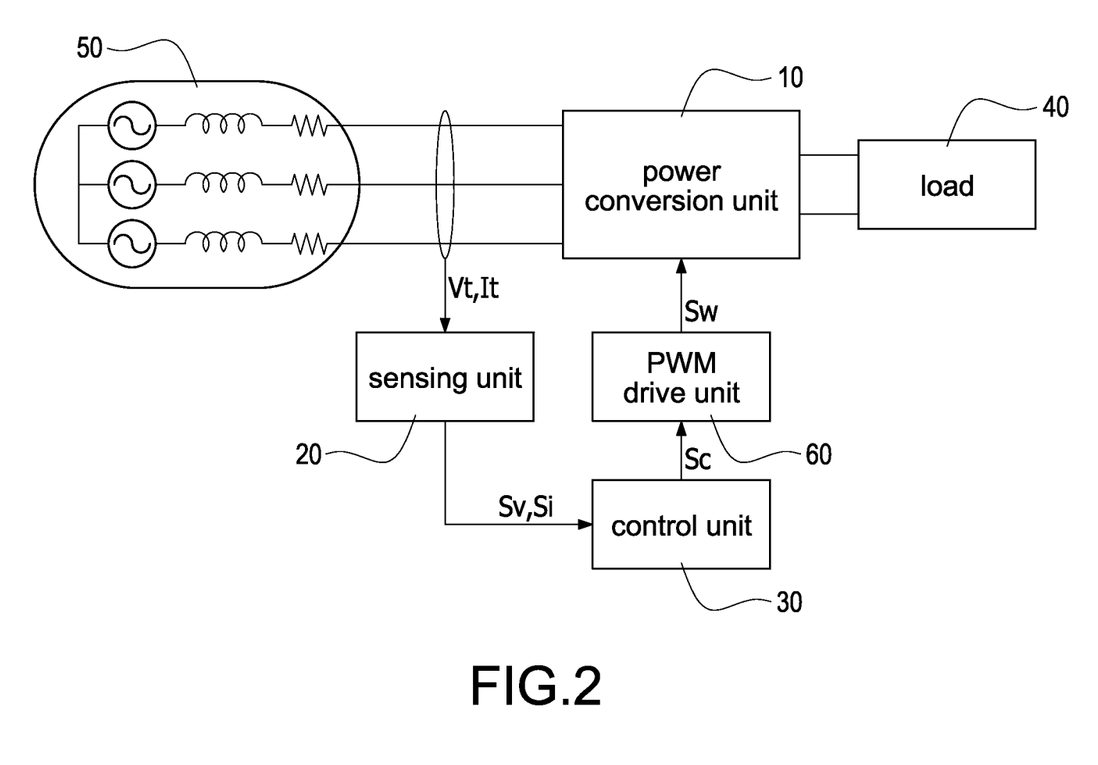
FIG. 2 is a circuit block diagram of a generator brake system according to the present invention.
Figure 3:
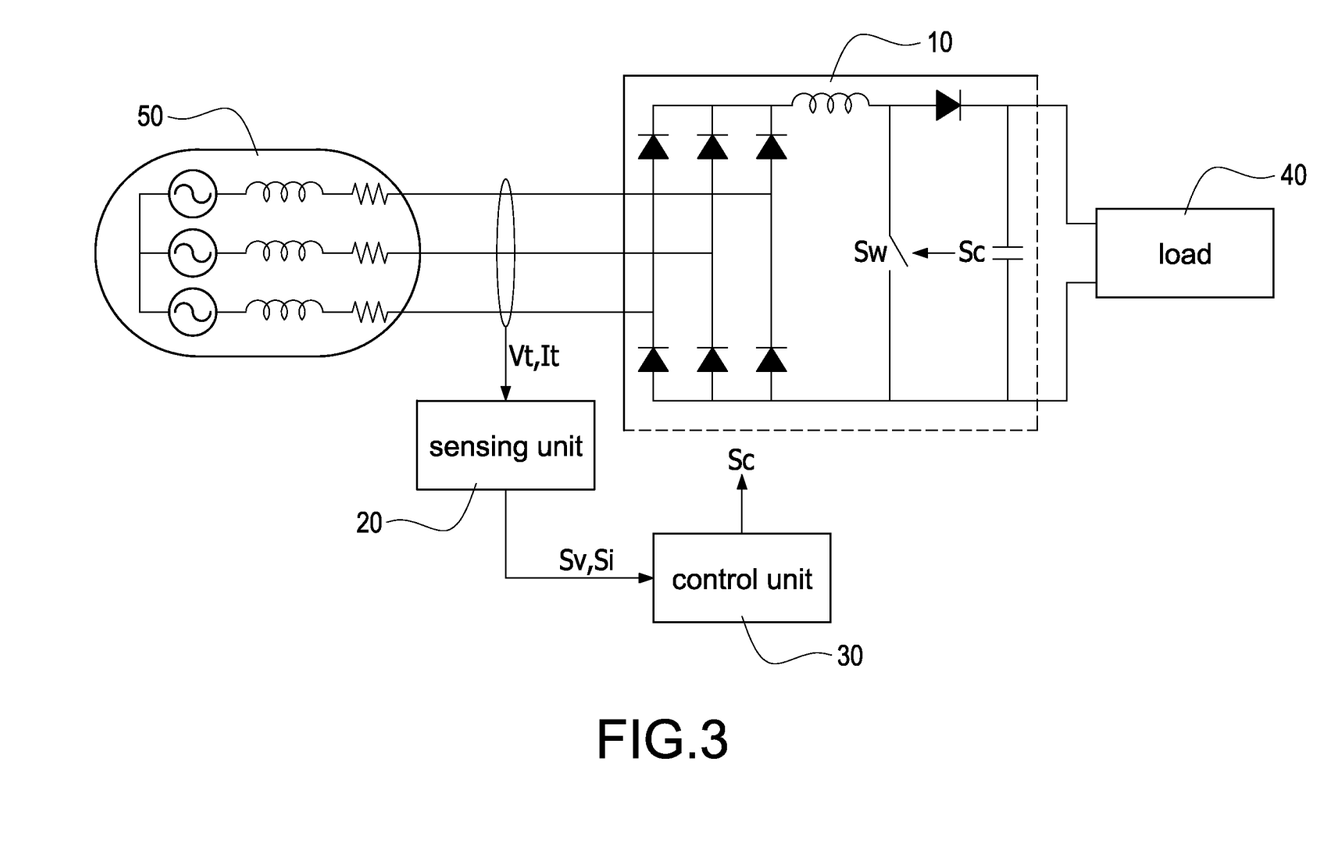
FIG. 3 is a circuit block diagram of the generator brake system according to the first embodiment of the present invention.
Figure 4:
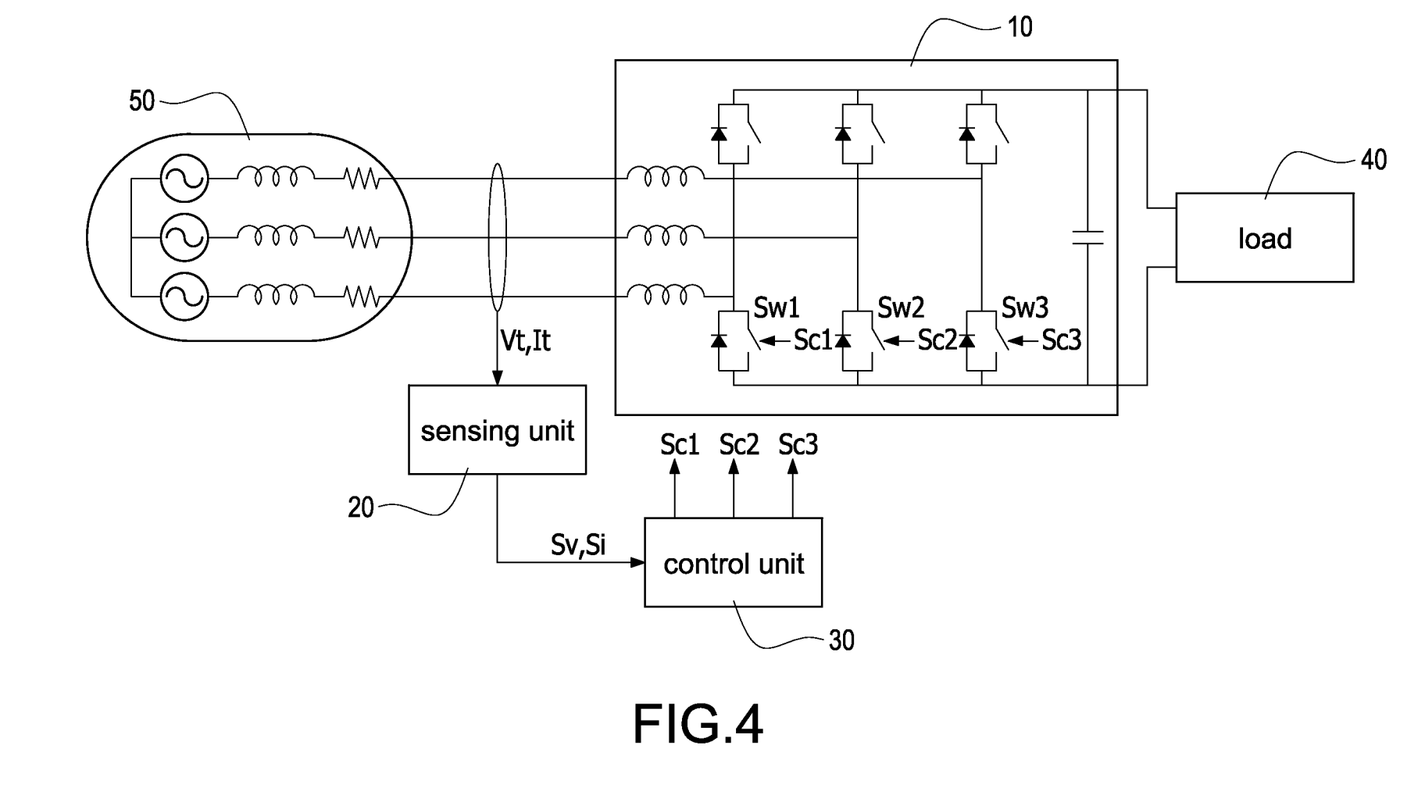
FIG. 4 is a circuit block diagram of the generator brake system according to the second embodiment of the present invention.

FIG. 2 is a circuit block diagram of a generator brake system according to the present invention. The generator brake system provides a brake control for a generator 50 driven by an external torque. In particular, the generator 50 is a permanent magnet generator (PMG) or a three-phase stator winding. However, the embodiments are only exemplified but are not intended to limit the scope of the disclosure. The generator brake system includes a power conversion unit 10, a sensing unit 20, and a control unit 30. The power conversion unit 10 receives an output voltage Vt and an output current It, both of which are generated from the generator 50. The power conversion unit 10 has at least one switch unit (as shown in FIG. 3 or FIG. 4). The sensing unit 20 receives the output voltage Vt and the output current It to generate a voltage signal Sv and a current signal Si. In other words, the sensing unit 20 has functions of sensing the voltage and current. The control unit 30 receives the voltage signal Sv and the current signal Si. When the control unit 30 receives a brake signal, the control unit 30 controls the output voltage Vt to be gradually reduced. Also, the control unit 30 generates at least one control signal Sc to correspondingly turn on the at least one switch unit to brake the generator 50 in a short circuit manner when the output voltage Vt is less than a threshold voltage. In particular, the control signal Sc is a pulse width modulation (PWM) signal. Hence, the generator brake system further includes a PWM drive unit 60 to provide the control signal Sc to correspondingly control the switch unit Sw. The detailed operation of the generator brake system will be described hereinafter as follows.

FIG. 3 is a circuit block diagram of the generator brake system according to a first embodiment of the present invention. In this embodiment, the power conversion unit 10 has one switch unit Sw which is used to execute the operation of braking the generator 50. The power conversion unit 10 has a three-phase full-bridge rectifying circuit having three bridge arms with six diodes. The three-phase full-bridge rectifying circuit is provided to rectify the three-phase AC power source outputted from the generator 50, including the output voltage Vt and the output current It, into a three-phase DC power source. When the generator 50 normally operates, the control unit 30 generates the control signal Sc to switch the switch unit Sw in a high-frequency manner so that the three-phase DC power source is provided to supply a rear-end load 40. However, the embodiment is only exemplified but is not intended to limit the scope of the disclosure. In other words, the rectified three-phase DC power source can be transmitted to an electric grid so that the power generation system can be cooperatively operated with the electric grid.

FIG. 4 is a circuit block diagram of the generator brake system according to a second embodiment of the present invention. In this embodiment, the power conversion unit 10 has three switch units Sw1, Sw2, Sw3, all of which are used to execute the operation of braking the generator 50. The power conversion unit 10 has a three-phase full-bridge rectifying circuit having three bridge arms with six diodes and six switch elements connected in parallel. The three-phase full-bridge rectifying circuit is provided to rectify the three-phase AC power source outputted from the generator 50, including the output voltage Vt and the output current It, into a three-phase DC power source. When the generator 50 normally operates, the control unit 30 generates the control signals Sc1, Sc2, Sc3 to switch the switch units Sw1, Sw2, Sw3 in a high-frequency manner so that the three-phase DC power source is provided to supply a rear-end load 40. However, the embodiment is only exemplified but is not intended to limit the scope of the disclosure. In other words, the rectified three-phase DC power source can be transmitted to an electric grid so that the power generation system can be cooperatively operated with the electric grid.

Figure 5:
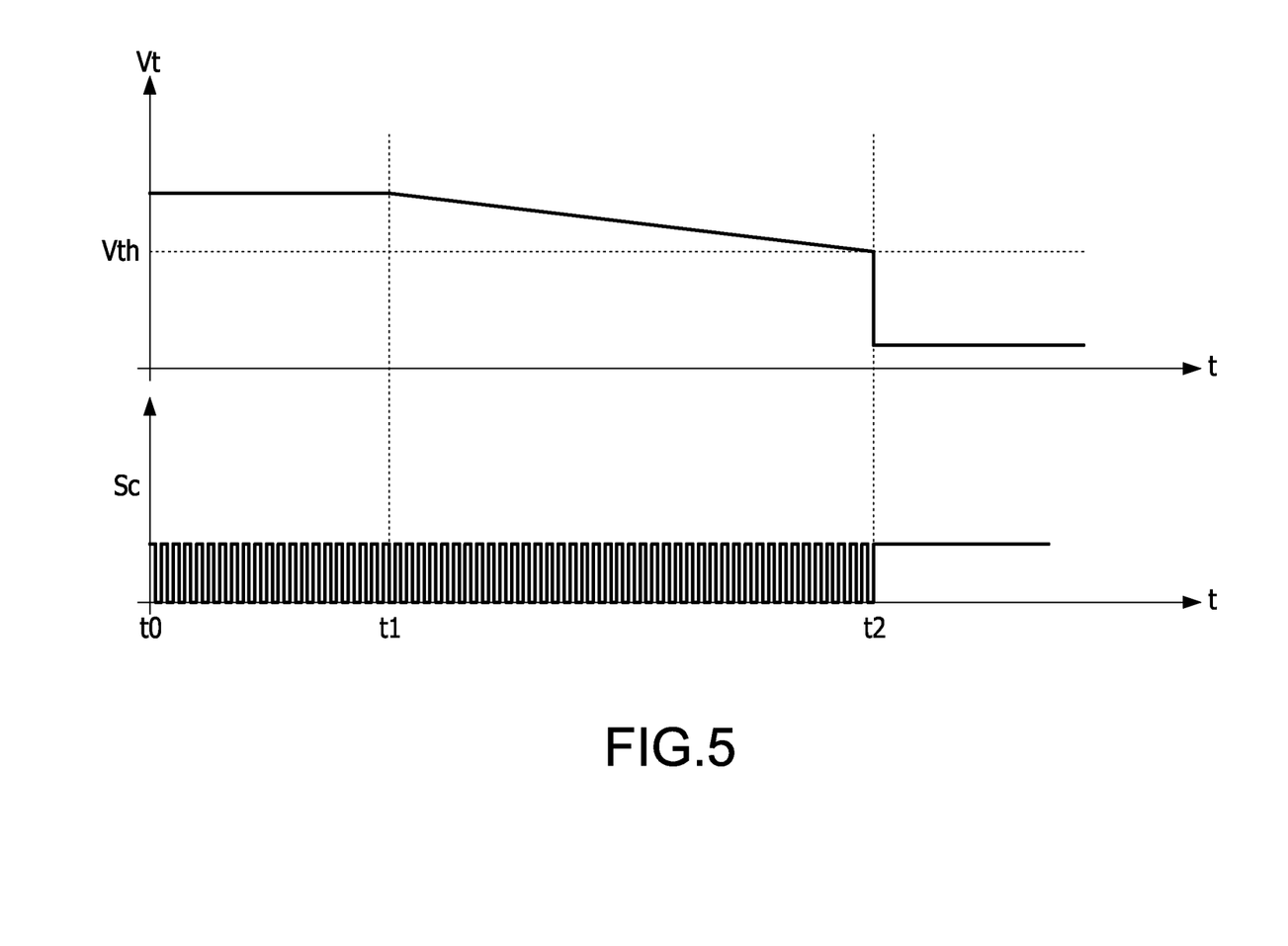
FIG. 5 shows the waveform of controlling the generator brake system according to the present invention.

FIG. 5 shows the waveform of controlling the generator brake system according to the present invention. The waveforms of the output voltage Vt and the control signal Sc are shown in FIG. 5, respectively. For convenience, it is assumed that the power conversion unit 10 has one switch unit Sw used to execute the operation of braking the generator 50. Especially, the output voltage Vt is one phase voltage of the three-phase output voltage, and the output voltage Vt is illustrated in amplitude variation. At a time point t0, the generator 50 normally operates without being braked, that is, the generator 50 is not in an over-load operation or an abnormal operation. At this time, the control unit 30 generates the control signal Sc to switch the switch unit Sw in a high-frequency manner. In this operation, the output voltage Vt generated from the generator 50 is nearly constant. Also, the generator 50 is loaded in a maximum power point tracking (MPPT) operation according to a voltage-current curve. Until a time point t1, the generator 50 is in an over-load operation or an abnormal operation. At this time, the control unit 30 receives a brake signal and controls the output voltage Vt to be gradually reduced. At this time, the control unit 30 still generates the control signal Sc to switch the switch unit Sw in a high-frequency manner. Until a time point t2, the output voltage Vt is less than a threshold voltage. At this time, the control unit 30 generates the high-level control signal Sc to turn on the switch unit Sw to brake the generator 50 in a short circuit manner.

Especially, if the power conversion unit 10 has three switch units Sw1, Sw2, Sw3 to execute the operation of braking the generator 50, the control unit 30 controls the output voltage Vt to be gradually reduced at the time point t1. At this time, the control unit 30 still generates the control signals Sc1, Sc2, Sc3 to correspondingly switch the switch units Sw1, Sw2, Sw3 in a high-frequency manner. Until a time point t2, the output voltage Vt is less than a threshold voltage. At this time, the control unit 30 generates the high-level control signals Sc1, Sc2, Sc3 to correspondingly turn on the switch units Sw1, Sw2, Sw3 to brake the generator 50 in a short circuit manner.

Figure 6:
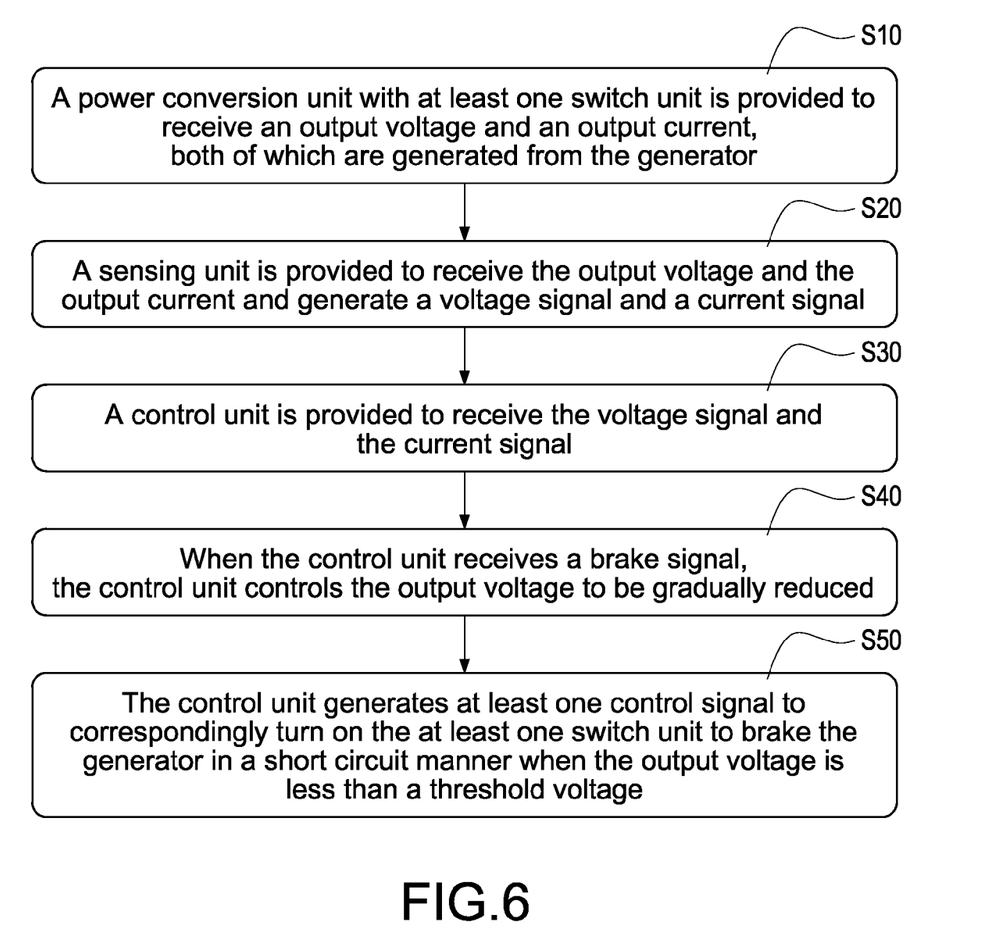
FIG. 6 is a flowchart of a method of controlling the generator brake system according to the present invention.

FIG. 6 is a flowchart of a method of controlling the generator brake system according to the present invention. The generator brake system provides a brake control for a generator 50 driven by an external torque. The control method includes the following steps. First, a power conversion unit with at least one switch unit is provided to receive an output voltage and an output current, both of which are generated from the generator (S10). Afterward, a sensing unit is provided to receive the output voltage and the output current, and generate a voltage signal and a current signal (S20). In particular, the sensing unit has functions of sensing the voltage and current. Then, a control unit is provided to receive the voltage signal and the current signal (S30). When the control unit receives a brake signal, the control unit controls the output voltage to be gradually reduced (S40). When the output voltage is less than a threshold voltage, the control unit generates at least one control signal to correspondingly turn on the at least one switch unit to brake the generator in a short circuit manner (S50). In addition, when the generator normally operates, the control unit generates the control signal to switch the switch unit in a high-frequency manner so that the rectified three-phase DC power source is provided to supply a rear-end load. However, the embodiment is only exemplified but is not intended to limit the scope of the disclosure. In other words, the rectified three-phase DC power source can be transmitted to an electric grid so that the power generation system can be cooperatively operated with the electric grid.

Figure 7:
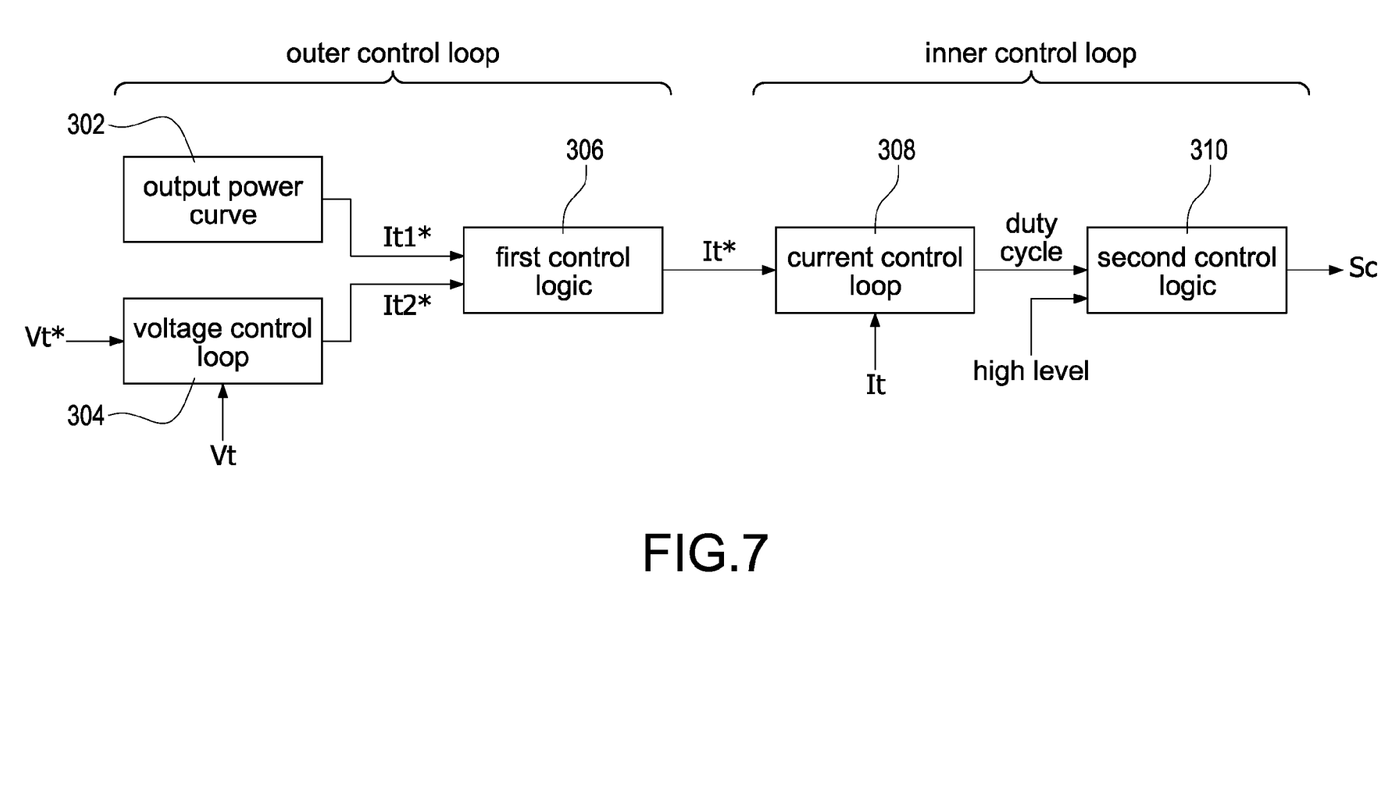
FIG. 7 is a block diagram of controlling the generator brake system according to the present invention.

FIG. 7 is a block diagram of controlling the generator brake system according to the present invention. The block diagram illustrates a brake control mechanism in the interior of the control unit 30. In particular, the brake control mechanism can be implemented by firmware or software. The brake control mechanism mainly has an outer control loop and an inner control loop. Also, the outer control loop and the inner control loop are also known as the voltage control loop and the current control loop, respectively. The detailed operations of the outer control loop and the inner control loop will be described in FIG. 8 and FIG. 9, respectively.

Figure 8:
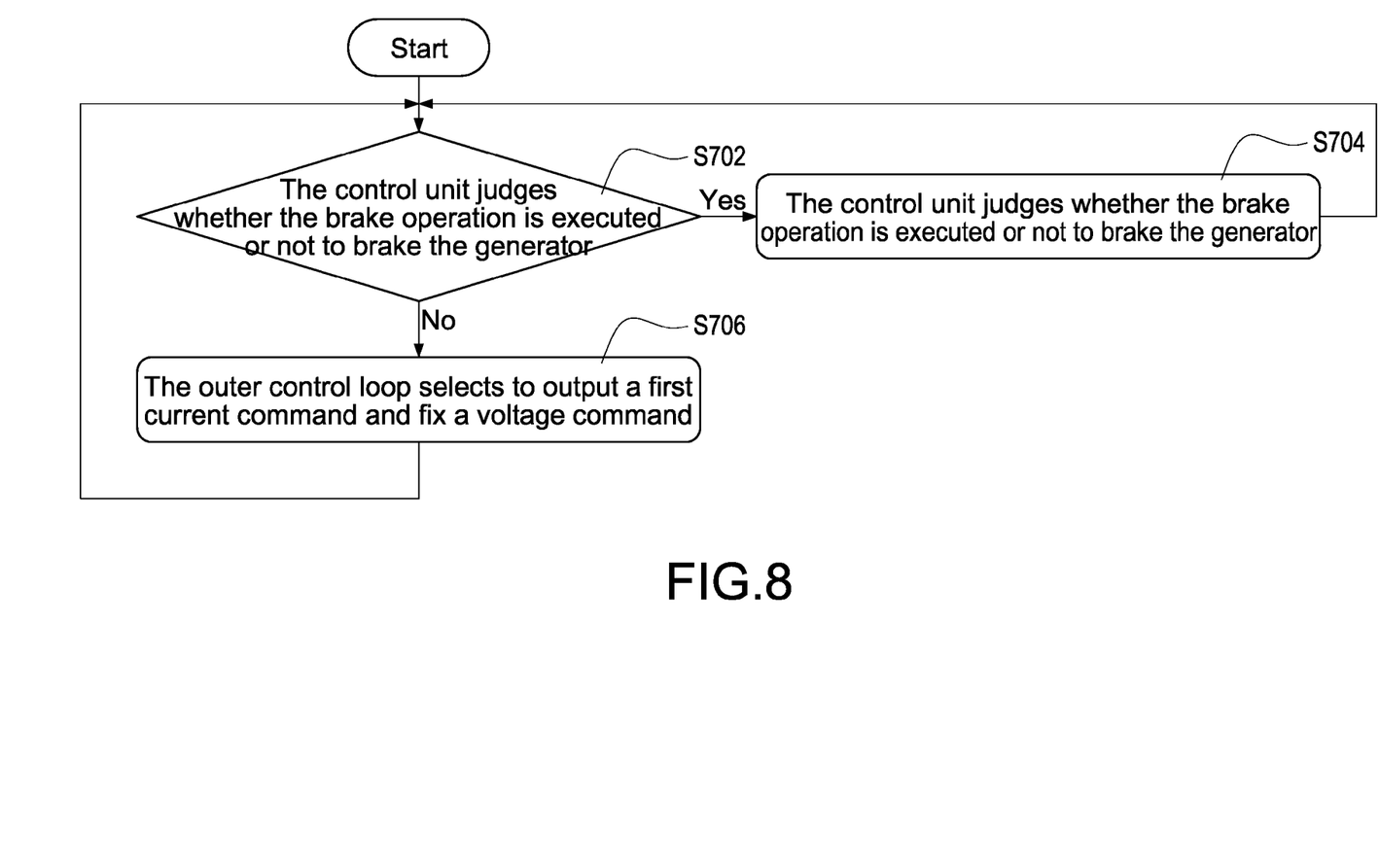
FIG. 8 is a flowchart of controlling an outer loop of the generator brake system according to the present invention.

FIG. 8 is a flowchart of controlling an outer loop of the generator brake system according to the present invention. The control unit 30 judges whether the brake operation is executed or not to brake the generator 50 (S702). In other words, the control unit 30 judges whether the control unit 30 receives the brake signal or not. If the control unit 30 does not receive the brake signal, the generator 50 normally operates. At this time, the outer control loop selects to output a first current command It1* and fix a voltage command Vt* (S706). In other words, the outer control loop outputs the first current command It1* according to an output power curve table of the generator 50 when the generator 50 normally operates. Accordingly, the first control logic 306 outputs the first current command It1* to be a current command It*, and the output voltage Vt is nearly constant. At the step (S702), when the control unit 30 receives the brake signal, the generator 50 is in an over-load operation or an abnormal operation. At this time, the outer control loop selects to output a second current command It2* and gradually reduces the voltage command Vt* (S704). In other words, the outer control loop outputs the second current command It2* according to a voltage control loop 304 when the generator 50 needs a brake protection. Accordingly, the first control logic 306 outputs the second current command It2* to be the current command It*, and the output voltage Vt is gradually reduced by the voltage command Vt*.

Figure 9:
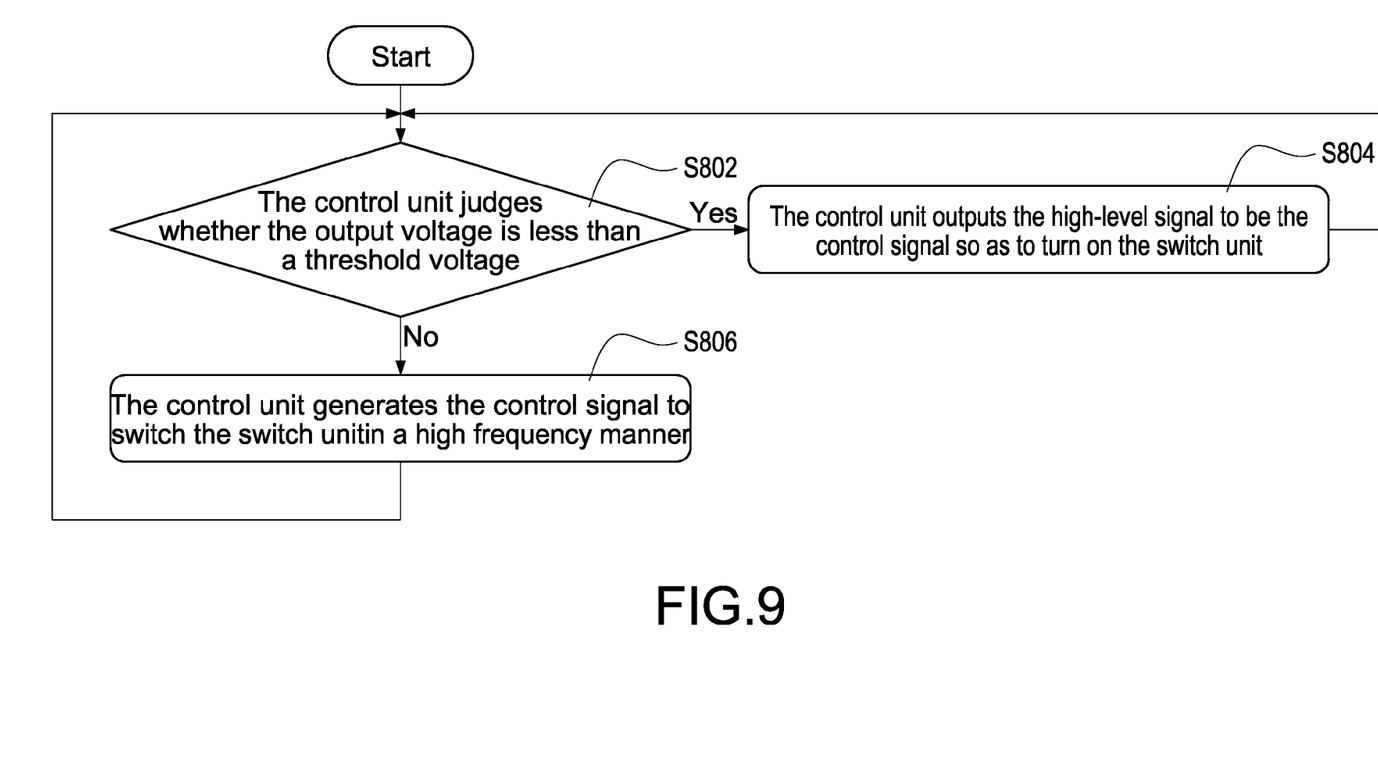
FIG. 9 is a flowchart of controlling an inner loop of the generator brake system according to the present invention.

FIG. 9 is a flowchart of controlling an inner loop of the generator brake system according to the present invention. A current control loop 308 receives the output current It and the current command It*, and the output current It is varied by the current command It*. More specifically, the current control loop 308 generates a high-frequency switching duty cycle according to an amplified error difference between the output current It and the current command It*, and outputs the high-frequency switching duty cycle to a second control logic 310. In addition, the second control logic 310 simultaneously receives a high-level signal. The control unit 30 judges whether the output voltage Vt is less than a threshold voltage Vth (S802). The output voltage Vt is gradually reduced during the operation of braking the generator 50. If the output voltage Vt is greater than or equal to the threshold voltage Vth, the control unit 30 generates the control signal Sc to switch the switch unit Sw in a high-frequency manner (S806) so that the electricity generated from the generator 50 is supplied to the rear-end load 40. At the step (S802), if the output voltage Vt is less than the threshold voltage Vth during the operation of braking the generator 50, the control unit 30 outputs the high-level signal to be the control signal Sc so as to turn on the switch unit Sw (S804) to brake the generator 50 in a short circuit manner.

In conclusion, the present invention has following advantages:

1. The control unit 30 is implemented by the firmware or software to achieve the brake control for PMGs to overcome problems of reduction of life time and invalidation of brake protection of the hardware switches because of frequently switching the switches and failure of switch contacts; and 2. The voltage control loop 304 is used to control the output voltage Vt to be gradually reduced by the voltage command Vt*. Also, the control unit 30 generates the high-level control signal Sc to turn on the switch unit Sw so as to brake the generator 50 in a short circuit manner when the output voltage Vt is less than a threshold voltage Vth. Accordingly, the generator 50 can be braked under the low-current operation to ensure the safety and accuracy of braking the generator 50.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A generator brake system for providing a brake control of a generator driven by an external torque, the generator brake system comprising:
    a power conversion unit receiving an output voltage and an output current, generated from the generator, and the power conversion unit having at least one switch unit;
    a sensing unit receiving the output voltage and the output current, and generating a voltage signal and a current signal; and
    a control unit receiving the voltage signal and the current signal; wherein the control unit controls the output voltage to be gradually reduced when the control unit receives a brake signal; the control unit generates at least one control signal to correspondingly turn on at least one switch unit so as to brake the generator in a short circuit manner when the output voltage is less than a threshold voltage.

2. The generator brake system in claim 1, wherein the control unit generates the control signal to switch the switch unit in a high-frequency manner when the control unit does not receive the brake signal.

3. The generator brake system in claim 2, wherein the control unit is configured to generate one control signal to control the switch unit when the power conversion unit has one switch unit; the control unit generates three control signals to correspondingly control the switch units when the power conversion unit has three switch units.

4. The generator brake system in claim 3, wherein the power conversion unit further comprises a three-phase full-bridge rectifying circuit including three bridge arms with six diodes.

5. The generator brake system in claim 2, wherein the control unit provides an outer control loop, and the outer control loop comprises:
    a voltage-current curve table providing a first current command;
    a voltage control loop comparing the output voltage with a voltage command to provide a second current command; and a first control logic receiving the first current command and the second current command;

wherein the first control logic outputs the first current command to be a current command when the control unit does not receive the brake signal; the first control logic outputs the second current command to be the current command and gradually reduces the voltage command when the control unit receives the brake signal.

6. The generator brake system in claim 4, wherein the control unit provides an inner control loop; the inner control loop comprises:

a current control loop comparing the output current with the current command to generate a high-frequency switching signal; and a second control logic receiving the high-frequency switching signal and a high-level conduction signal;

wherein the second control logic outputs the high-frequency switching signal to be the control signal to switch the switch unit in a high-frequency manner when the output voltage is greater than or equal to the threshold voltage value; the second control logic outputs the high-level conduction signal to be the control signal so as to brake the generator in a short circuit manner when the output voltage is less than the threshold voltage value.

7. The generator brake system in claim 6, wherein the control signal is a pulse width modulation (PWM) signal, and the generator brake system further comprises a PWM drive unit for providing the control signal to control the switch unit.

8. A method of braking a generator driven by an external torque, comprising steps of:

providing a power conversion unit with at least one switch unit to receive an output voltage and an output current, generated from the generator;

providing a sensing unit to receive the output voltage and the output current and generate a voltage signal and a current signal;

providing a control unit to receive the voltage signal and the current signal;

reducing gradually the output voltage controlled by the control unit when the control unit receives a brake signal; and generating at least one control signal by the control unit to correspondingly turn on the at least one switch unit to brake the generator in a short circuit manner when the output voltage is less than a threshold voltage.

9. The method of braking the generator in claim 8, wherein after the step of receiving the voltage signal and the current signal by the control unit, the method further comprises:

generating the control signal by the control unit to switch the switch unit in a high-frequency manner when the control unit does not receive the brake signal.

10. The method of braking the generator in claim 9, wherein the control unit generates one control signal to control the switch unit when the power conversion unit has one switch unit; the control unit generates three control signals to correspondingly control the switch units when the power conversion unit has three switch units.

11. The method of braking the generator in claim 9, wherein the control unit provides an outer control loop, and the outer control loop comprises:

a voltage-current curve table providing a first current command;

a voltage control loop comparing the output voltage with a voltage command to provide a second current command; and a first control logic receiving the first current command and the second current command;

wherein the first control logic outputs the first current command to be a current command when the control unit does not receive the brake signal; the first control logic outputs the second current command to be the current command and gradually reduces the voltage command when the control unit receives the brake signal.

12. The method of braking the generator in claim 11, wherein the control unit provides an inner control loop; the inner control loop comprises:

a current control loop comparing the output current with the current command to generate a high-frequency switching signal; and a second control logic receiving the high-frequency switching signal and a high-level conduction signal;

wherein the second control logic outputs the high-frequency switching signal to be the control signal to switch the switch unit in a high-frequency manner when the output voltage is greater than or equal to the threshold voltage value; the second control logic outputs the high-level conduction signal to be the control signal to brake the generator in a short circuit manner when the output voltage is less than the threshold voltage value.

13. The method of braking the generator in claim 12, wherein the control signal is a pulse width modulation (PWM) signal, and the method further comprises a step of providing a PWM drive unit for providing the control signal to control the switch unit.

* * * * *